United States Patent [19]
Thompson

[11] 3,747,457
[45] July 24, 1973

[54] PORTABLE SAW MILL
[76] Inventor: Eldon K. Thompson, 1424 S. 4th St., Dayton, Wash. 99328
[22] Filed: Jan. 28, 1972
[21] Appl. No.: 221,641

[52] U.S. Cl.......................... 83/471.2, 83/4, 83/488, 83/477.1, 83/928
[51] Int. Cl............................................... B27b 7/02
[58] Field of Search...................... 83/404.1, 471.2, 83/745, 4, 477.1, 928, 488; 143/47, 47 A, 117, 105, 125

[56] References Cited
UNITED STATES PATENTS
| | | | |
|---|---|---|---|
| 3,374,813 | 3/1968 | Tillery............................. | 83/404.1 |
| 3,180,377 | 4/1965 | Pinder............................. | 143/105 R |
| 3,548,896 | 12/1970 | Larsen et al..................... | 83/745 |
| 2,672,896 | 3/1954 | Shurtliff.......................... | 83/404.1 |

Primary Examiner—Donald R. Schran
Attorney—Hyman Berman et al.

[57] ABSTRACT

A portable saw mill, hydraulically powered and having a rotary saw mounted on a carriage for longitudinal movement past the log, which is held stationary during the cutting operation. The carriage can be moved vertically to permit the saw to clear a new log as it is moved onto the saw table. Edging saw blades are carried by the carriage to trim the side edges of the board as it is being cut from the log by the rotary saw. A conveyor is provided for moving the sawn boards away from the saw with this conveyor being reversible to move the slabs to the slab pile as they are removed from the log. A log conveyor is provided for moving the logs into position on the saw table for cutting.

9 Claims, 4 Drawing Figures

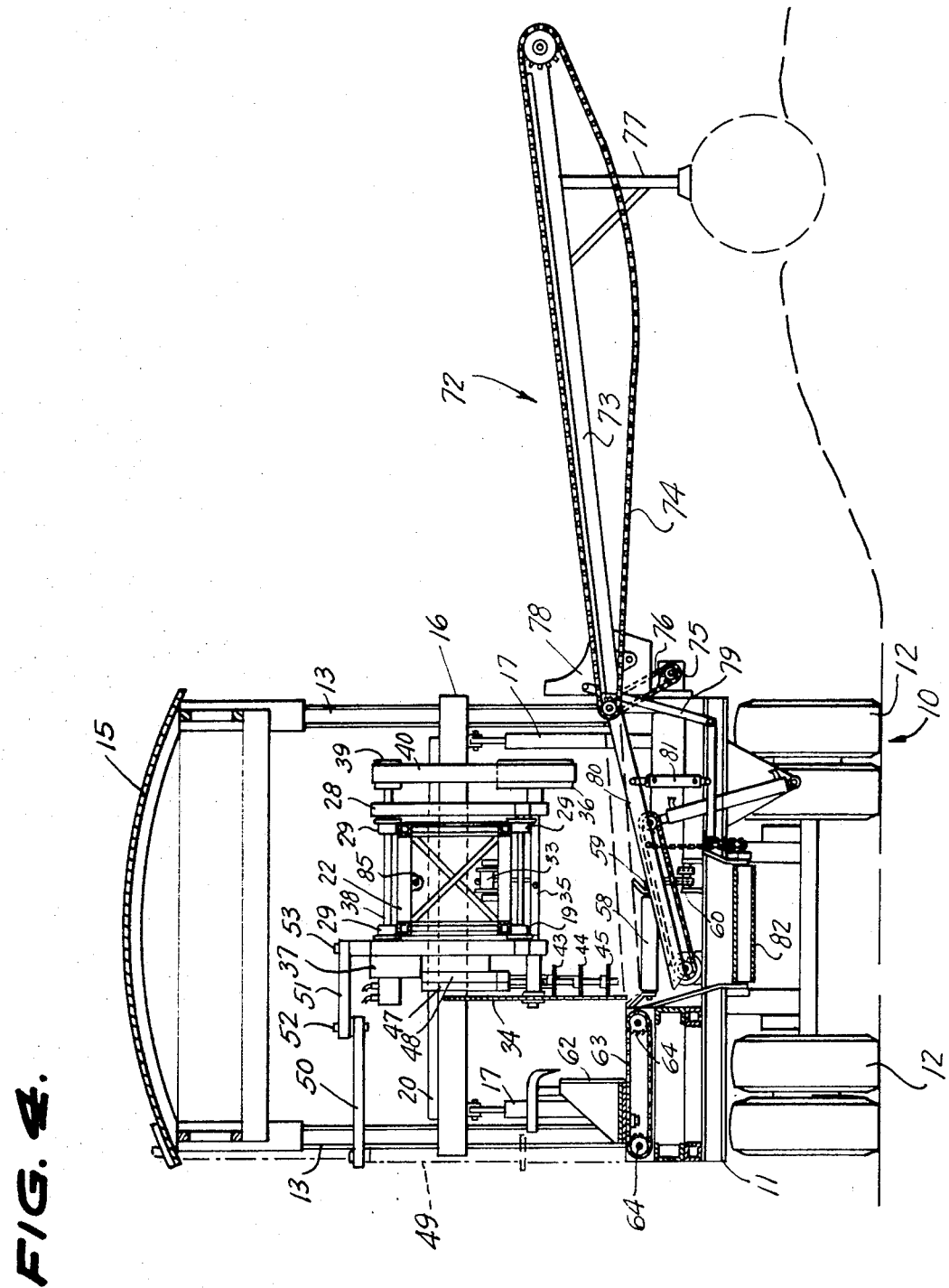

PORTABLE SAW MILL

BACKGROUND OF THE INVENTION

FIELD OF THE INVENTION

The present invention relates to a portable saw mill which can be legally moved over the highways with a minimum of assembly and disassembly required at the site.

SUMMARY OF THE INVENTION

The present invention is directed to a hydraulically powered saw mill in which the saw is moved past the log and carries edger saw blades therewith to trim the edges of the boards as they are cut. Conveyors are provided for moving the cut boards away from the saw with the conveyor being reversible to move slabs away from the saw in the opposite direction. A conveyor is also provided for moving logs onto the saw table in a position for cutting.

The rotary saw is vertically adjustable within the saw mill.

The primary object of the invention is to provide a saw mill which is completely portable and can be moved over the highways legally with a minimum of assembly and disassembly time at each site.

Other objects and advantages will become apparent in the following specification when considered in the light of the attached drawings.

BRIEF DESCRIPTION OF THE DRAWINGS

FIG. 4 is a transverse sectional view taken along the line 4—4 of FIG. 1, looking in the direction of the arrows.

Referring now to the drawings in detail wherein like reference characters indicate like parts through the several figures, the reference numeral 10 indicates generally a portable saw mill constructed in accordance with the invention.

Figure 1:
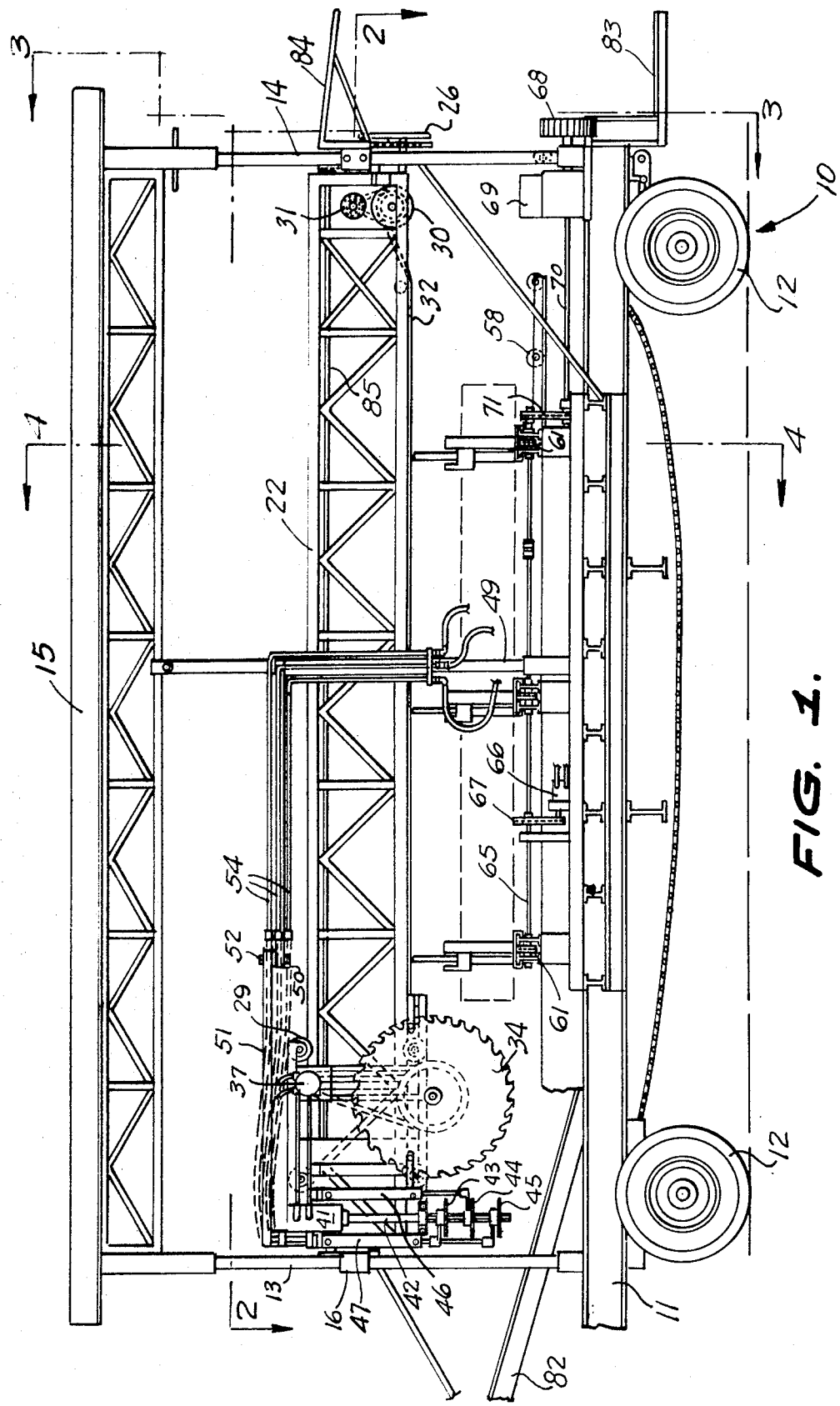
FIG. 1 is a side elevation of the invention.
Figure 2:
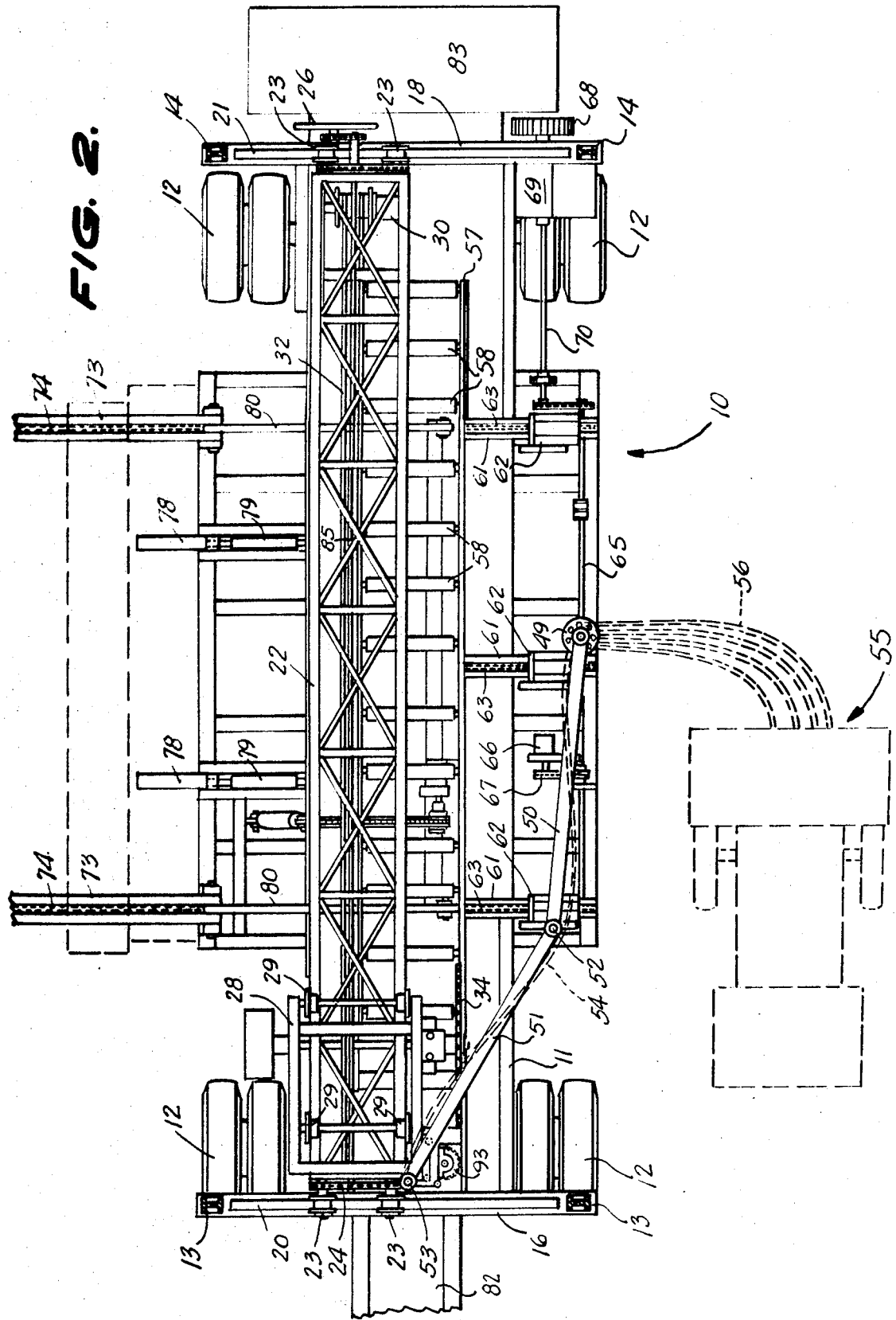
FIG. 2 is a horizontal sectional view taken along the line 2—2 of FIG. 1, looking in the direction of the arrows.

The saw mill 10 includes a frame 11, supported on ground engaging wheels 12 and adapted to be transported from place to place as a trailer. A pair of upright posts 13 extend upwardly from one end of the frame 11, at the opposite corners thereof and a second pair of upright posts 14 extend upwardly from the frame 11, at the opposite end thereof and adjacent the corners.

A trussed roof structure 15 is supported on the pairs of posts 13-14 in spaced above parallel relation to the frame 11.

A transverse generally horizontal beam 16 is mounted on the post 13 for vertical sliding movement thereon. A pair of hydraulic cylinders 17 are connected between the beam 16 and the frame 11 to slide the beam 16 vertically on the post 13 as required. A transverse generally horizontal beam 18 is mounted on the post 14 for vertical sliding movement thereon. A pair of hydraulic cylinders 19 are connected between opposite end portions of the beam 18 and the frame 11 to vertically adjust the beam 18 on the post 14 as desired.

A rail 20 is secured to the top of the beam 16 and a rail 21 is secured to the top of the beam 18. A trussed beam 22 extends longitudinally of the saw mill 10, terminating adjacent the beam 16 at one end and the beam 18 at the opposite end. Channel wheels 23 are journaled on each end of the beam 22 on longitudinally extending pivots, with the channel wheels 23 engaging respectively the rail 20 and the rail 21, to permit the beam 22 to be moved transversely of the saw mill 10. The channel wheels 23 engaged with the rail 20 are connected by a chain and sprocket linkage 24 and the channel wheels 23 engaged with the rail 21 are connected by a chain and sprocket linkage 25. A hand wheel 26 is journaled on the beam 18 and is connected with a chain and sprocket linkage 27 to the chain and sprocket linkage 25 so that rotation of the wheel 26 will rotate the channel wheels 23 on the rail 21 and thus move the beam 22 transversely of the saw mill 10.

A generally rectangular carriage 28 is provided with a plurality of flanged wheels 29 engaging the upper and lower corners of the beam 22 to mount the carriage 28 on the beam 22 for longitudinal movement therealong. A cable drum 30 is mounted on one end of the beam 22 and is driven by a hydraulic motor 31. A cable 32 is wound on the drum 30 and extends over a pulley 33 at the opposite end of the beam 22. The cable 32 has its opposite ends secured to opposite sides of the carriage 28 so that rotation of the drum 30 will move the carriage 28 longitudinally along the beam 22 from one end thereof to the other.

A rotary saw 34 is detachably secured to a saw shaft 35 journaled in the carriage 28. A drive pulley 36 is secured to the opposite end of the shaft 35. A hydraulic motor 37 is mounted on the carriage 28 and has a shaft 38 journaled thereon extending to a drive pulley 39. A belt 40 connects the pulleys 36-39 so that the saw 34 is driven by the hydraulic motor 37.

A hydraulic motor 41 is mounted on the carriage 28 and has a shaft 42 depending therefrom, also journaled on the carriage 28. A plurality of saw blades 43, 44, and 45 are mounted on the lower end of the shaft 42 for vertical sliding movement thereon. A hydraulic cylinder 46 is mounted on the carriage 28 and is secured to the saw 44 to slide the saw 44 vertically on the shaft 42. The hydraulic cylinder 47 is mounted on the carriage 28 and is connected at its lower end to the blade 43. A hdyraulic cylinder 48 is mounted on the carriage 28 and is connected at its lower end to the saw blade 44. The saw blades 43,44 and 45 may be individually adjusted by actuation of their individual hydraulic cylinders 47, 46 and 48.

A post 49 is secured to the frame 11 and extends upwardly to the roof 15. An arm 50 is pivotally secured to the post 49 to swing thereabout in a horizontal plane. An arm 51 is secured to the outer end of the arm 50 by means of a pivot pin 52. The outer end of the arm 51 is secured to the carriage 28 by a pivot pin 53. The arms 50-51 swing on the carriage 28 and the post 49 as the carriage 28 moves longitudinally along the beam 22. The arms 51 support a plurality of hydraulic hoses 54 which power the hydraulic motors on the carriage 28.

A second trailer, generally indicated at 55, is used in conjunction with the portable saw mill 10 and has a source of hydraulic fluid under pressure which is fed to hydraulic lines 56 extending to the saw mill 10.

A roller conveyor 57 extends longitudinally of the saw mill 10 with each roller 58 driven by a belt 59 extending upward from a powered jack shaft 60. The rollers 58 may be rotated in either direction so as to convey boards in one direction and slabs in the opposite direction under the control of the operator.

A plurality of log supports 61 are mounted on the saw mill frame 11 and extend transversely with respect to the saw mill 10. A knee 62 is slidably mounted on each of the log supports 61 and is secured to an endless chain 63 trained over sprocket 64 at opposite ends of the log supports 61. A shaft 65 extends through each of the log supports 61 and has one of the sprockets 64 secured thereto. A hydraulic motor 66 is connected by a chain linkage 67 to the shaft 65 to rotate the shaft 65. A saw gauge 68 is mounted on a gear box 69 at one end of the saw mill 10 and a shaft 70 connects the gear box 69 through a chain linkage 71 to the shaft 65 so that movement of the knees 62 on the supports 61 can be measured by the gauge 68.

Dogs 72 on each of the knees 62 are provided for locking a Log L in position on the log supports 61.

Figure 3:
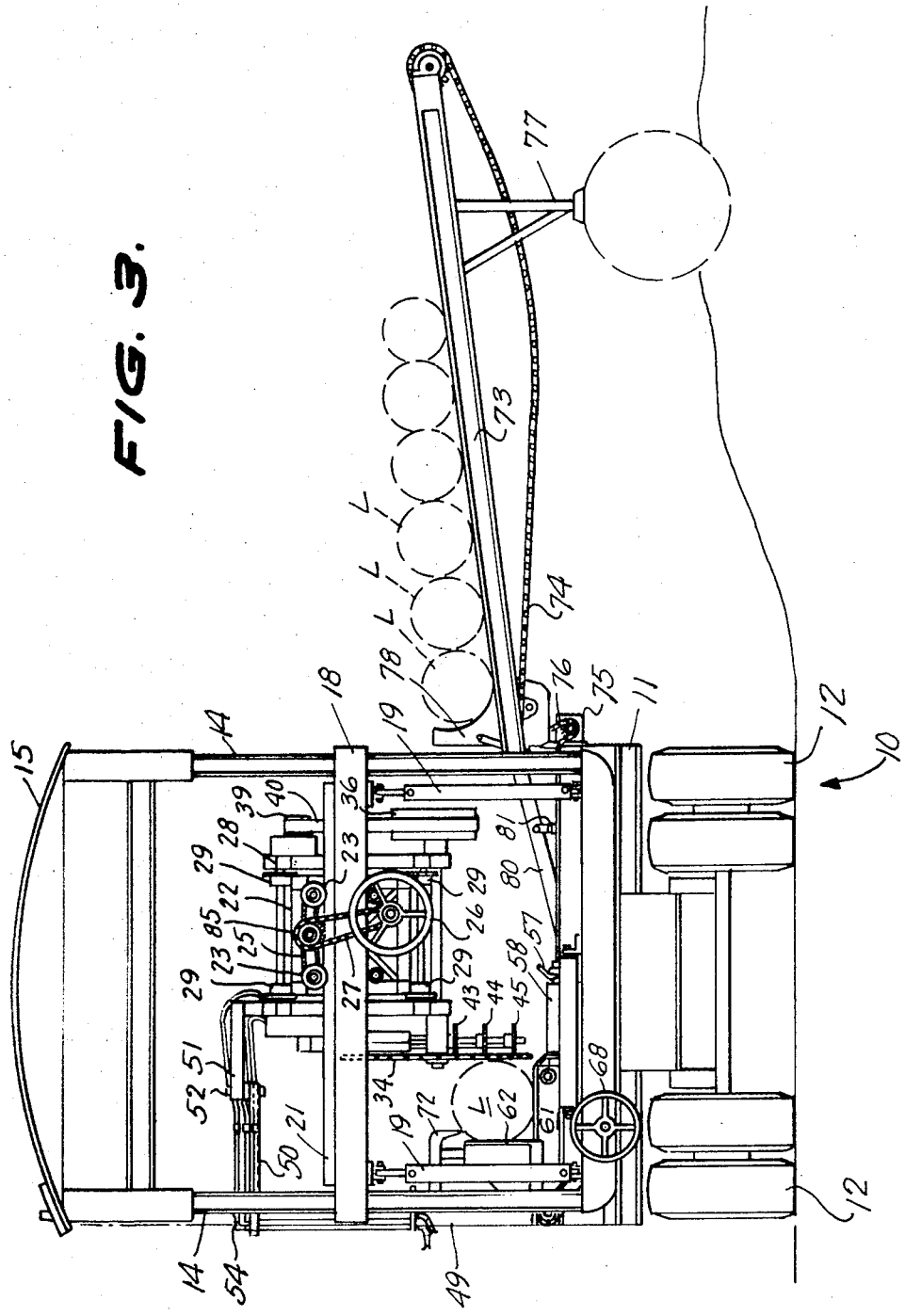
FIG. 3 is a transverse vertical sectional view taken along the line 3—3 of FIG. 1, looking in the direction of the arrows.

A log conveyor generally indicated at 72 includes a pair of beams 73 extending outwardly from the side of the saw mill 10 and having an endless chain conveyor 74 mounted thereon. A hydraulic motor 75 is connected by chain linkage 76 to the conveyor 74 to provide a power drive for same. A post 77 supports the outer ends of the beams 73 as can be seen in FIGS. 3 and 4. A log kicker 78 is pivotally mounted on the frame 11 and has a hydraulic ram 79 connected thereto to cause the kickers to pivot about and kick the Logs L one at a time into the saw mill 10. A pair of rails 80 are pivotally secured to the beams 73 and are moved upwardly by a hydraulic ram 81 to align the rails 80 with the log supports 61. In FIG. 4 the raised position of the rails 80 can be seen in broken lines showing that a slope is provided down which the logs L can roll after being kicked by the log kicker 78.

An endless conveyor 82 is mounted at one end of the saw mill 10 to receive boards from the conveyor 57 and convey them outwardly away from the saw mill 10.

An operator's platform 83 is secured to the frame 11 and is covered by a sloping roof 84 to protect the operator.

All of the power mechanisms of the saw mill 10 are driven by means of hydraulic pressure from the trailer 55 and are controlled by valves and electric switches in a conventional manner by the operator standing on the platform 83.

It should be noted that a shaft 85 is connected to the chain linkage 25 and the chain linkage 27 at one end of the saw mill 10, and extends to the chain linkage 24 at the opposite end thereof so that the wheel 26 will drive all of the channel wheels 23 simultaneously.

In the use and operation of the invention, logs L are loaded onto the conveyors 74 carried by the beams 73. The conveyors 74 maintain the innermost log L in contact with the log kicker 78. The rails 80 are then raised so that they are aligned with the beam 73 and log supports 61. The logs then move onto the log supports 61 and the logs 72 are engaged therewith to hold the logs L against the knees 62. The saw 34 is then moved past the log L cutting off a slab which falls on the conveyors 58 to eject the slab from one end of the saw mill 10. The edger saws 43, 44 and 45 are then adjusted so that as the next board is cut, it is simultaneously edged. The log 62 is moved outwardly toward the saw 34 between cuts by moving the knees 62 under control of the gauge 68. The conveyors 58 are reversed after all of the slabs are moved to one end of the saw mill 10 so that the boards cut from the log L can be moved to the opposite end of the saw mill 10.

Having thus described the preferred embodiment of the invention, it should be understood that numerous structural modifications and adaptations may be resorted to without departing from the spirit of the invention.

What is claimed is:

1. A portable saw mill comprising a frame, a plurality of ground engaging wheels supporting said frame, a log support on said frame for supporting a log in a position to be cut, an elongate beam supported in said saw mill above said frame for vertical and transverse adjustment with respect to said frame, upper and lower pairs of rails on said beam at the respective upper and lower edges thereof, a carriage encompassing said beam, a plurality of flanged wheels journalled in said carriage and engaging said upper and lower rails mounting said carriage for longitudinal translating movement on said beam, a power driven rotary saw mounted on said carriage, means on said beam for translating said carriage on said beam, a plurality of vertically adjustable edger saws mounted on a vertical power driven shaft journalled on said carriage for simultaneously edging a board being cut by said rotary saw, and power means on said carriage individually connected to each of said edger saws for vertically adjusting said edger saws on said power driven shaft.

2. A device as claimed in claim 1 wherein means are provided on said saw mill for conveying logs to said log supports.

3. A device as claimed in claim 1 wherein power means is provided on said beam for transversely adjusting said beam on said saw mill.

4. A device as claimed in claim 1 wherein power means is provided on said frame for vertically adjusting said beam with respect to said frame.

5. A device as claimed in claim 1 wherein means is provided on said saw support for index moving said log towards said rotary saw as boards are cut therefrom.

6. A device as claimed in claim 1 including a reversible power driven conveyor, positioned beneath said beam to receive boards and slabs cut from said log to deliver them from opposite ends of said saw mill.

7. A device as claimed in claim 2 wherein power means is provided on said beam for transversely adjusting said beam on said saw mill.

8. A device as claimed in claim 2 wherein power means is provided on said frame for vertically adjusting said beam with respect to said frame.

9. A device as claimed in claim 2 wherein means is provided on said saw support for index moving said log towards said rotary saw as boards are cut therefrom.

* * * * *